United States Patent
Atchity et al.

(10) Patent No.: US 9,258,252 B1
(45) Date of Patent: Feb. 9, 2016

(54) VIRTUAL SERVER RESOURCE MONITORING AND MANAGEMENT

(71) Applicant: Sprint Communications Company L.P., Overland Park, KS (US)

(72) Inventors: Gregory J. Atchity, Overland Park, KS (US); Michael R. Hartwig, Lee's Summit, MO (US); Dustin T. Holub, Prairie Village, KS (US); Justin A. Martin, Olathe, KS (US); Terry L. Reeves, Lee's Summit, MO (US); Brian J. Washburn, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/449,986

(22) Filed: Aug. 1, 2014

Related U.S. Application Data (62) Division of application No. 12/939,742, filed on Nov. 4, 2010, now Pat. No. 8,825,858.

(51) Int. Cl.

| | |
|---|---|
| *G06F 15/173* | (2006.01) |
| *G06F 15/16* | (2006.01) |
| *H04L 12/911* | (2013.01) |
| *H04L 12/26* | (2006.01) |
| *G06F 9/455* | (2006.01) |
| *H04L 12/24* | (2006.01) |

(52) U.S. Cl.
CPC .......... *H04L 47/822* (2013.01); *G06F 9/45533* (2013.01); *H04L 41/0896* (2013.01); *H04L 43/08* (2013.01)

(58) Field of Classification Search
CPC .................................................. H04L 41/0896

USPC .......................................... 709/224, 226, 231
See application file for complete search history.

(56) References Cited

U.S. PATENT DOCUMENTS

| | | | |
|---|---|---|---|
| 6,393,480 | B1 | 5/2002 | Qin et al. |
| 6,820,042 | B1 | 11/2004 | Cohen et al. |
| 6,973,415 | B1 | 12/2005 | Saghier et al. |
| 7,082,381 | B1 | 7/2006 | Saghier et al. |
| 7,197,428 | B1 | 3/2007 | Saghier et al. |

(Continued)

OTHER PUBLICATIONS

Martin, Justin A., et al., Patent Application entitled "Server Maintenance Modeling in Cloud Computing", filed on Dec. 14, 2011, U.S. Appl. No. 13/326,184.

(Continued)

*Primary Examiner* — Hieu Hoang (57) ABSTRACT

A system is provided that monitors a first and second virtual server on a first physical server containing a physical processor, monitors physical processor usage wherein capacity is allocated to a first entitlement comprising a first percentage of the capacity guaranteed to the first virtual server, to a second entitlement comprising a second percentage guaranteed to the second virtual server, and to a third percentage one of unallocated and partially and totally allocated to a virtual server based on need, and wherein the percentages total to one hundred percent. The system monitors usage of a first virtual processor associated with the first virtual server, receives a request for first virtual processor utilization by percentage, determines utilization comprising first virtual processor usage divided by a first allocated processing capacity comprising the first entitlement and a portion of the third percentage currently allocated to the first virtual server, and reports the utilization.

10 Claims, 5 Drawing Sheets

(56) References Cited

U.S. PATENT DOCUMENTS

| | | | |
|---|---|---|---|
| 7,243,049 | B1 | 7/2007 | Saghier et al. |
| 7,296,256 | B2 | 11/2007 | Liu et al. |
| 7,369,967 | B1 | 5/2008 | Washburn et al. |
| 7,412,492 | B1 | 8/2008 | Waldspurger |
| 7,454,464 | B2 | 11/2008 | Puthenkulam et al. |
| 7,464,224 | B2 | 12/2008 | Kano |
| 7,680,916 | B2 | 3/2010 | Barnett et al. |
| 7,890,473 | B1 | 2/2011 | Wyett et al. |
| 7,934,108 | B2 | 4/2011 | Radhakrishnan et al. |
| 7,937,473 | B2 | 5/2011 | Nakadai |
| 7,962,916 | B2 | 6/2011 | Ramanathan |
| 8,005,644 | B1 | 8/2011 | Evans et al. |
| 8,069,240 | B1 | 11/2011 | Ybarra, III |
| 8,201,180 | B2 | 6/2012 | Briscoe et al. |
| 8,296,424 | B2 | 10/2012 | Malloy et al. |
| 8,423,646 | B2 | 4/2013 | Jamjoom et al. |
| 8,429,276 | B1 | 4/2013 | Kumar et al. |
| 8,606,905 | B1 | 12/2013 | Martin et al. |
| 8,825,858 | B1 | 9/2014 | Atchity et al. |
| 9,154,366 | B1 | 10/2015 | Martin et al. |
| 2004/0221290 | A1 | 11/2004 | Casey et al. |
| 2005/0289308 | A1 | 12/2005 | Kano |
| 2006/0085541 | A1 | 4/2006 | Cuomo et al. |
| 2007/0028244 | A1* | 2/2007 | Landis ............... G06F 9/5016 718/108 |
| 2007/0043860 | A1* | 2/2007 | Pabari ............... G06F 9/5072 709/224 |
| 2007/0130423 | A1 | 6/2007 | Liu et al. |
| 2007/0168494 | A1 | 7/2007 | Liu et al. |
| 2008/0022277 | A1 | 1/2008 | Kano |
| 2008/0172554 | A1 | 7/2008 | Armstrong et al. |
| 2008/0235388 | A1* | 9/2008 | Fried ............... G06F 9/5088 709/231 |
| 2009/0157870 | A1 | 6/2009 | Nakadai |
| 2009/0187782 | A1* | 7/2009 | Greene ............... G06Q 30/0283 713/340 |
| 2009/0259737 | A1 | 10/2009 | Aikoh et al. |
| 2009/0271485 | A1 | 10/2009 | Sawyer et al. |
| 2010/0250746 | A1 | 9/2010 | Murase |
| 2011/0055470 | A1 | 3/2011 | Portolani |
| 2011/0213997 | A1 | 9/2011 | Kansal et al. |
| 2011/0276675 | A1 | 11/2011 | Singh et al. |
| 2012/0096165 | A1* | 4/2012 | Madduri ............... G06F 9/5011 709/226 |
| 2012/0297238 | A1 | 11/2012 | Watson et al. |
| 2012/0303322 | A1 | 11/2012 | Rego et al. |
| 2013/0163408 | A1* | 6/2013 | Siegwart ............... H04L 47/125 370/221 |

OTHER PUBLICATIONS

FAIPP Pre-Interview Communication dated May 24, 2013, U.S. Appl. No. 12/900,154, filed on Oct. 7, 2010.

Notice of Allowance dated Aug. 6, 2013, U.S. Appl. No. 12/900,154, filed on Oct. 7, 2010.

FAIPP Pre-Interview Communication dated Dec. 16, 2013, U.S. Appl. No. 13/326,184, filed on Dec. 14, 2011.

FAIPP Office Action dated Feb. 19, 2014, U.S. Appl. No. 13/326,184, filed on Dec. 14, 2011.

FAIPP Pre-Interview Communication dated Jan. 22, 2014, U.S. Appl. No. 12/939,742 filed on Nov. 4, 2010.

Notice of Allowance dated Apr. 21, 2014, U.S. Appl. No. 12/939,742 filed on Nov. 4, 2010.

Davis, David, "What is the Best Performance Monitoring Application for VMward ESX Server?," dated Jan. 8, 2009, www.petri.com, all pages.

Notice of Allowance dated Jun. 8, 2015, U.S. Appl. No. 13/326,184, filed Dec. 14, 2011.

* cited by examiner

VIRTUAL SERVER RESOURCE MONITORING AND MANAGEMENT

CROSS-REFERENCE TO RELATED APPLICATIONS

This application is a divisional of and claims priority under 35 U.S.C. §120 to U.S. patent application Ser. No. 12/939,742, filed on Nov. 4, 2010, entitled, "Virtual Server Resource Monitoring and Management," which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtual servers allow the sharing of underlying physical machine resources by two or more instances of server software. The practice of partitioning a single server so that it appears as multiple servers has become commonplace in recent years in enterprise networks. The software layer providing the virtualization may be called a virtual machine monitor or hypervisor. Virtualization of servers permits multiple operating system environments to co-exist on the same computer in isolation from each other. Virtualization promotes ease of application provisioning, more flexible maintenance, high availability and disaster recovery. Virtualization may be used for database servers, application servers, file servers, web servers, and other applications. Virtual web servers may be a way of providing low-cost web hosting services. Instead of requiring a separate computer for each server, a plurality of virtual servers may execute on the same physical computer. Web site performance may not be affected and each web site may behave as if it is hosted by a dedicated physical server computer.

SUMMARY

In an embodiment, a system is provided. The system comprises a processor, a memory, and a monitoring application, that, when executed on the processor, monitors a first virtual server application and a second virtual server application executing on a first physical server computer containing a first physical processor. The system also monitors usage of the first physical processor wherein processing capacity of the first physical processor is allocated to a first entitlement comprising a first percentage of the processing capacity guaranteed to the first virtual server application, is allocated to a second entitlement comprising a second percentage of the processing capacity guaranteed to the second virtual server application, and is allocated to a third percentage wherein the processing capacity allocated to the third percentage is one of not allocated to a virtual server application and one of partially and totally allocated to a virtual server application for a time period based on need of virtual server application, and wherein the total of the first percentage, the second percentage, and the third percentage is one hundred percent. The system also monitors usage of a first virtual processor associated with the first virtual server application and receives a request from a client device for a report of current utilization level of the first virtual processor by percentage. The system also determines the current utilization level comprising current usage of the first virtual processor divided by a first allocated processing capacity wherein the first allocated processing capacity comprises a total of the first entitlement and a portion of the third percentage currently allocated to the first virtual server application. The system also reports the current utilization level of the first virtual processor to the client device.

In an embodiment, a processor-implemented method is provided comprising a monitoring server monitoring resource usage by a first virtual server application and a second virtual server application executing on a first physical server computer. The method also comprises the monitoring server receiving a first message providing notification that a first enterprise application is scheduled to be installed on the first physical server computer and be accessible via the first virtual server application. The method also comprises the monitoring server analyzing projections for resource usage by the first enterprise application. The method also comprises the monitoring server determining that memory currently allocated to the first virtual server application is not adequate based on the projected memory usage of the first enterprise application. The method also comprises the monitoring server reallocating memory currently allocated to the second virtual server application to the first virtual server application in preparation for the installation of the first enterprise application.

In an embodiment, a processor-implemented method is provided. The method comprises a monitoring server monitoring resource usage by a first virtual server application and a second virtual server application executing on a first physical server computer. The method also comprises the monitoring server monitoring resource usage by a third virtual server application and a fourth virtual server application executing on a second physical server computer. The method also comprises the monitoring server receiving notification that a physical processor has been detected as failing, wherein the physical processor is installed in the first physical server computer hosting the first virtual server application, and wherein the physical processor is associated with a processor entitlement allocated to the first virtual server application. The method also comprises the monitoring server receiving a request to determine a destination for relocation of a first enterprise application executing on the first virtual server application. The method also comprises the monitoring server analyzing the second virtual server application, the third virtual server application, and the fourth virtual server application as candidate destinations for relocation of the first enterprise application. The method also comprises the monitoring server determining that the first application cannot perform satisfactorily if relocated to any one of the second virtual server application, the third virtual server application, and the fourth virtual server application as presently configured. The method also comprises the monitoring server determining that effecting a first change request comprising increasing the processor entitlement of the fourth virtual server application, decreasing the processor entitlement of the third virtual server application, and reallocating memory from the third virtual server application to the fourth virtual server application boosts the capacity of the fourth virtual server application to satisfactorily host the first enterprise application. The method also comprises the monitoring server directing that the first enterprise application be relocated from the first virtual server application to the fourth virtual server application after the first change request is effected.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods of virtual server resource monitoring and management referenced to physical server resources. A virtual server approaching its entitled percentage of allocated physical processor capacity may be provided additional processor capacity from a pool of unallocated capacity shared with other virtual servers executing on the same physical server computer. A virtual server executing on a physical server may be allocated a percentage of the physical processing capacity of the physical server as an entitlement, as the minimum percentage of the physical server's processing capacity that the virtual server will have available to it on a continuing basis. Several virtual servers may execute on a physical server with each virtual server provided an entitlement percentage or other allocated amount.

The present disclosure teaches that, in an embodiment, the individual entitlements or processor allocations for the virtual servers may not total to 100% of the physical processor capacity of the physical server upon which the several virtual servers execute. An unallocated portion of the physical processor may be held in reserve and be available to the virtual servers if their processing load causes them to approach and risk exceeding their entitlement levels of processor capacity. When an administrator of a virtual server or enterprise application executing on the virtual server requests information about current processor utilization, the present disclosure teaches that some or the entire unallocated portion of physical processor capacity may be included in reports of calculated available processor capacity along with the virtual server's entitlement percentage. This may provide comfort to an administrator when the enterprise application may be experiencing high processing volume.

In previous implementations, when an administrator of an enterprise application executing on a virtual server requested information about resource usage, for example processor usage, by the application, the report might have been based strictly on the processor entitlement associated with the application and its associated virtual server. Although additional processor capacity may have been unused and available beyond the entitlement percentage, previous implementations may not have considered the additional capacity as potentially being made available to the enterprise application, if needed. The administrator of an enterprise application approaching its entitlement level, in previous implementations wherein usage reporting is based strictly on entitlement and does not consider unallocated and available processor capacity, may be provided a resource utilization report that may be misleading about total physical processor usage. Such a report potentially may be unnecessarily alarming to the administrator. The administrator may be led to believe that the application may be close to exhausting the processor capacity and risking application failure when in reality a significant portion of the processor capacity may still remain available. For example, because it is common for virtualization software to dynamically adjust processor entitlement based on application processor utilization so the processor entitlement is just slightly more than is currently used by the subject application, known tools for analyzing processor utilization may report that application processor utilization is about 95 percent or 98 percent, based on the application processor utilization of processor entitlement. This kind of processor utilization calculation may provide an unrealistic picture of application processor utilization with reference to actual physical resources available on the subject servers and is not very useful to application administrators. The present disclosure teaches a system and methods that may provide a more realistic report of resource usage based on the availability of unallocated resource capacity and the availability of capacity allocated to other enterprise applications that may be unused and available for limited periods.

The present disclosure also teaches monitoring of a plurality of physical server computers hosting a plurality of virtual server instances. The present disclosure teaches a system wide view of an organization's physical servers, virtual servers, and hosted applications. Allocations and usage of physical processing capacity and memory by each virtual server may be viewed and analyzed. Usage of resources by each application executing on virtual servers also may be viewed. The disclosed system may provide administrators of physical server farms hosting a plurality of virtual servers a view of physical server resources available to the virtual servers. Administrators may view unallocated physical capacity that may be provisioned to virtual servers in need of the additional capacity. Administrators of virtual servers may be provided a view of their virtual servers with resource availability including resources beyond their entitlement percentages, thus giving them a less limited and more realistic view of their flexibility in accessing additional processor and memory capacity when needed.

The present disclosure also may provide an interface for engineers and planners for use in analyzing current network capacity as well as physical and virtual server capacity. They may use the interface to analyze current usage of applications and physical and virtual server resources and to plan the placement of new applications in the server farms. This may support more accurate projections about needs for new hardware and software in the system. The system wide view promoted by the interface also may promote reallocation of physical server resources between virtual servers and expedient movement of applications for server maintenance and in emergencies, for example when physical server resources fail or when a virtual server experiences an unexpected processing load.

Figure 1:
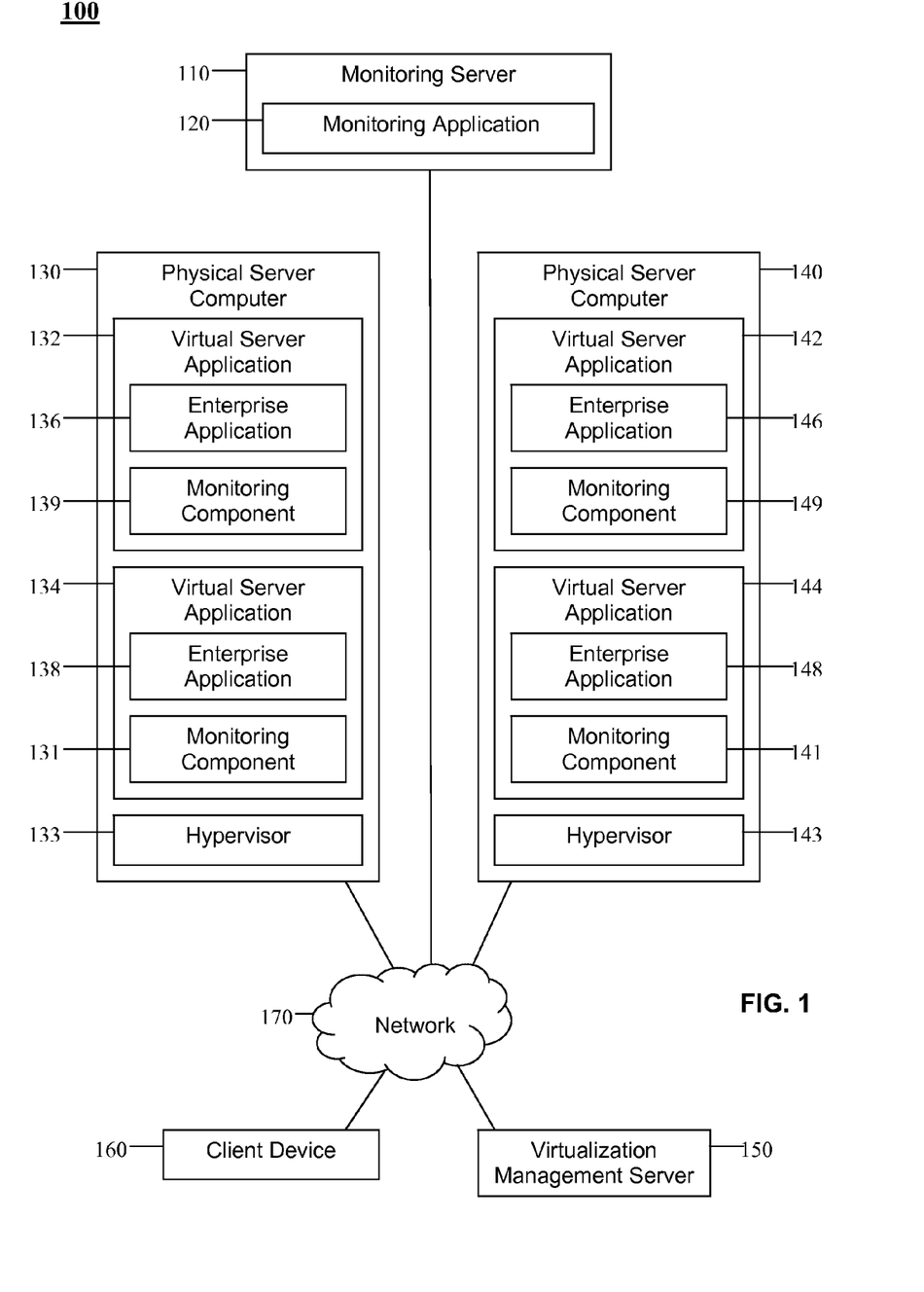
FIG. 1 is a block diagram of a system according to an embodiment of the disclosure.

Turning now to FIG. 1, a system 100 of virtual server resource monitoring and management is provided. The system 100 comprises a monitoring server 110, a monitoring application 120, physical server computers 130, 140, virtual server applications 132, 134, 142, 144, enterprise applications 136, 138, 146, 148, monitoring components 131, 141, 139, 149, a virtualization management server 150, hypervisors 133, 143, a client device 160, and a network 170.

The monitoring server 110 is a computer system. Computer systems are described in detail hereinafter. The monitoring application 120 executes on the monitoring server 110 and monitors and reports the usage of physical server resources allocated to virtual server applications 132, 134, 142, 144 executing on the physical server computers 130, 140. While the virtual server application 132 may execute on a physical server computer 130, it may be allocated only a portion or percentage of the processing capacity and memory capacity of the physical server computer 130. The portion of a physical processor committed or guaranteed to the virtual server application 132 may be referred to as the processor entitlement. In an embodiment, two or more virtual server applications 132, 134 executing on the same physical server computer 130 may be allocated processor entitlements that together comprise less that 100% of the processing capacity of a physical processor. Processor capacity not allocated as entitlement to the virtual server applications 132, 134 may be held in reserve for situations where one or more virtual server applications 132, 134 become overloaded and need additional capacity beyond their entitlement levels. The virtual server application 132 experiencing heavy processing volume may approach its entitlement level of guaranteed physical processor capacity. If the unallocated portion of the physical processor is available, the monitoring application 120 may allocate part or all of the unallocated portion to the virtual server application 132, increasing its total available processing capacity.

When calculating total available processor capacity, the monitoring application 120 may include some or all of the unallocated capacity as available capacity in addition to the processor entitlement percentage that is guaranteed to the virtual server applications 132, 134. By including at least some of the unallocated processor capacity with the entitlement capacity, the monitoring application 120 may provide comfort when reporting to an administrator of the enterprise application 136 associated with the virtual server application 132 that may be concerned about approaching virtual server resource limits. The present disclosure teaches that since the unallocated capacity may be shared by two or more virtual server applications 132, 134 executing on the same physical server computer 130, the unallocated capacity may be regarded by the monitoring application 120 as communally available to either of the virtual server applications 132, 134 that may need the unallocated capacity from time to time. The monitoring application 120 may simultaneously report a portion or the entirety of the unallocated capacity as available to each virtual server application 132, 134 based on a calculated likelihood that both virtual server applications 132, 134 would need the unallocated capacity at the same time.

The monitoring application 120 may report allocations of physical server memory in a similar manner as with processors. An enterprise application 136 and its associated virtual server application 132 may be provided with a percentage of total physical memory of the physical server computer 130. The percentage may be calculated and allocated in a manner similar to the provision of processor entitlement percentage. Enterprise applications 136, 138 and their associated virtual server applications 132, 134 executing on the same physical server computer 130 may separately be provided allocations of physical memory that together total less than 100% of the installed physical memory. Some of the installed physical memory may not be allocated to either virtual server application 132, 134. When calculating and reporting the amount of physical memory that may be available to the virtual server application 132 at a given time, the monitoring application 120 may include unallocated memory in the calculation along with the allocated or committed amount. The monitoring application 120 also may include file system cache in such calculations.

The monitoring application 120 may promote the viewing of physical resources allocated to a plurality of virtual server applications 132, 134, 142, 144 executing on a physical server computers 130, 140, respectively, as well as the viewing of unallocated resources available on those physical server computers 130, 140. By being provided visibility of multiple physical server computers 130, 140 that are hosting multiple virtual server applications 132, 134, 142, 144, administrators and managers may develop a system wide view of committed and available processor and memory physical resources. They also may simultaneously view the enterprise applications 136, 138, 146, 148 that are accessible via the virtual server applications 132, 134, 142, 144. Administrators may view and analyze resource usage by the enterprise applications 136, 138, 146, 148. Such a broad view may promote efficient placement of the enterprise applications 136, 138, 146, 148 and allow planning for temporary or permanent movement of the enterprise applications 136, 138, 146, 148. Such movement may be necessitated by emergency situations, such as a failure of a hardware component that may require the enterprise application 136 to be made accessible via a different virtual server application 134. Such movement also may be necessitated by an unexpected increase in activity for an enterprise application 136 wherein the virtual server application 132 hosting the enterprise application 136 does not have the resources to satisfactorily process the increase in activity.

Network planners may examine projections for new enterprise applications 136, 138, 146, 148 to be installed on the physical server computers 130, 140 and may make decisions about the virtual server applications 132, 134, 142, 144 that may be used to host the new enterprise applications 136, 138, 146, 148. Network planners may examine resource requirements of the new enterprise applications 136, 138, 146, 148 and may use the views provided by the monitoring application 120 of resource usage and availability across virtual server applications 132, 134, 142, 144 and their hosting physical server computers 130, 140 to make decisions about where to locate the new enterprise applications 136, 138, 146, 148. The view provided by the monitoring application 120 also may promote planning for server maintenance as well as creating action plans to respond to emergencies such as power outages and server failures.

Virtual server applications 132, 134, 142, 144 execute on physical server computers 130, 140 that may segment physical resources of the physical server computers 130, 140 such that each instance of the virtual server application 132, 134 may appear to be a separate physical machine that has its own operating system and may be rebooted separately from other instances. The virtual server application 132 may execute as if it is a fully independent and freestanding machine with a dedicated server operating system. The enterprise applications 136, 138, 146, 148 may not be aware that the virtual server applications 132, 134, 142, 144 upon which they are executing are in fact virtual and are not the only server instance executing on the physical server computers 130, 140. Administrators and managers of the enterprise application 136 may not be conscious of or be concerned that the enterprise application 136 associated with the virtual server application 132 is sharing physical resources with another enterprise application 138 that may be associated with a different virtual server application 134, with both virtual server applications 132, 134 executing on the physical server computer 130. The administrators and managers may instead be primarily concerned with performance of the enterprise application 136 under commitments received under a service level agreement (SLA) entered into with a provider of computing services that may own or operate the physical server computer 130.

The system also comprises the hypervisors 133, 143 that may be components of the physical server computers 130, 140, respectively. The virtualization management server 150 and the hypervisors 133, 143 are tasked with creating, destroying, and managing the resources of the virtual server applications 132, 134, 142, 144. The virtual server applications 132, 134 are allocated a share of resources of the physical server computer 130, including processor and memory. The virtual server applications 142, 144 are likewise allocated a share of resources of the physical server computer 140, including processor and memory. The allocation may be done in a manner in which the enterprise applications 136, 138, 146, 148 executing in the virtual environment are not aware of any other physical resources except those allocated to each enterprise application 136, 138, 146, 148 by the hypervisors 133, 143. The virtual server applications 132, 134, 142, 144 are presented with an emulated or virtualized set of hardware. Administrators of the enterprise applications 136, 138, 146, 148 may neither know nor care that this hardware is not strictly physical and instead may be focused on application performance results promised under a service level agreement. The hypervisor 133 translates, maps, and converts requests from the virtual server applications 132, 134, that may arise from resource requests submitted by administrators of enterprise applications 136, 138, 146, 148, into the appropriate resource requests on the physical server computer 130.

The virtualization management server 150 and the hypervisors 133, 143 may be third-party, commercially available software packages that perform server virtualization or are components of a larger software package whose functionality includes server virtualization. While FIG. 1 depicts the virtualization management server 150 as a separate component, suggesting that the virtualization management server 150 executes on a dedicated physical computer, in an embodiment, the virtualization management server 150 may execute on the monitoring server 110 or on another computer that hosts other software applications unrelated to the present disclosure. While FIG. 1 depicts a single instance of the virtualization management server 150, in an embodiment, multiple instances of these components may be existent and active. The monitoring application 120 may not itself perform virtualization tasks such as creating and destroying virtual server applications 132, 142 on physical server computers 130, 140, but it may interact with the hypervisors 133, 143 and components (not shown) of the virtualization management server 150 in gathering, assembling, analyzing, and presenting information as described herein. While the virtualization management server 150 and the hypervisors 133, 143 may be third-party software, application programming interfaces (API) of the virtualization management server 150 may be made available. The monitoring application 120 and other components of the system 100 may access these application programming interfaces and make modifications that allow the monitoring application 120 to customize aspects of the hypervisors 133, 143 to promote the components of the system 100 to interact more efficiently with and draw upon the functionality of the hypervisors 133, 143.

While the monitoring application 120 may not command changes to virtual server applications 132, 142, the monitoring application 120 may gather and distribute information about the enterprise applications 136, 138, 146, 148 associated with the virtual server applications 132, 142, their resource usage, and available resources on the physical server computers 130, 140 that may be accessed by the enterprise applications 136, 138, 146, 148. The monitoring application 120 may provide views of this information that the virtualization management server 150 does not provide. This information may be valuable to administrators, managers, engineers, and planners in making decisions about allocating resources to virtual server applications 132, 142, in planning for new enterprise applications 136, 146, in planning for application and server maintenance, and in planning emergency response. Because the monitoring application 120 gathers, aggregates, and presents configuration and usage data in manners that other implementations may not, physical and virtual resources may be viewed in new ways and used more efficiently. The present disclosure teaches the aggregation of system performance data, configuration data, and information about planned configurations that may promote decisions about where resources and enterprise applications 136, 138, 146, 148 may be allocated and installed. This may promote more accurate forecasting about when new physical hardware should be acquired, where existing hardware should be relocated, and document why the hardware is to be acquired or relocated.

The system also comprises the monitoring components 131, 141, 139, 149 that are associated with the virtual server applications 132, 134, 142, 144, respectively, and interact with the monitoring application 120. The monitoring components 131, 141, 139, 149 gather information about the usage of physical and virtual resources by the virtual server applications 132, 134, 142, 144. The monitoring components 131, 141, 139, 149 send the information to the monitoring application 120 and/or make the information available for the monitoring application 120 to retrieve the information from the monitoring components 131, 141, 139, 149.

In an example, the physical server computer 130 may have a single physical processor installed and the processor may have a capacity of 10,000 million instructions per second (MIPS). Two virtual server applications 132, 134 may be configured to execute on the physical server computer 130. Each virtual server application 132, 134 may be provided an entitlement of 40% of the processing capacity of the physical server computer 130, or 4000 million instructions per second of capacity for each virtual server application 132, 134. This leaves 20% or 2000 million instructions per second of unallocated processor capacity. The 40% entitlement comprises the minimum amount of physical processing capacity that each of the virtual server applications 132, 134 is entitled to use. Administrators of each enterprise application 136, 138, associated with the virtual server applications 132, 134, respectively, may know that they will have at least that amount of capacity available. During some time periods they may have more capacity available to them, but the administrators know that the 40% is the minimum physical processor capacity generally available to them. The enterprise applications 136, 138 also share the remaining 20% of capacity that is unallocated and may be available to their corresponding virtual server applications 132, 134 during periods of high processing load when they approach their 40% entitlement levels. In addition, the enterprise application 136 may permit portions of its own 40% entitled capacity to be used by the enterprise application 138 when the enterprise application 138 is experiencing unusually high load, and vice versa. Administrators and managers of the enterprise applications 136, 138 may agree beforehand on conditions under which portions of their own 40% entitlements are to be temporarily provided for use by the other. Alternatively, conditions may be imposed upon the enterprise applications 136, 138 in accordance with service level agreements (SLA) they may have entered into to receive service. For example, the enterprise applications 136, 138 may be willing to share up to 75% of their entitlements, or 30% of the total processing capacity of the physical server computer 130. Therefore, while an administrator of the enterprise application 136 knows that the entitled 40% of physical processing capacity is available under normal load conditions, the additional total unallocated 20% may be available if needed, and even up to the 30% more from the capacity of the neighboring enterprise application 138 may be available under extreme circumstances.

In an embodiment, administrators of the enterprise application 136, 138 may not be aware of their processor entitlement in terms of percentage of processing capacity of the physical server computer 130. Administrators may not be advised of the identity or capacity of the physical server computer 130 upon which their enterprise application 136 may execute. The enterprise application 136 may be moved from the physical server computer 130 to the physical server computer 140 for any reason, and the administrator may not be advised of this action. The administrator may instead focus attention on a service level agreement in effect with a service provider that controls the physical server computers 130, 140 and provides virtual server services. The service provider under its arrangement may commit to a service level agreement that promises delivery of specific processing speeds or response times and does not disclose a committed physical server processor capacity. Under other circumstances, the entitlement percentage, 40% in the example, may be expressly agreed upon by the parties.

The administrator of the enterprise application 136 also, in the example, may be aware of the additional 20% available unallocated capacity as well as the portion of capacity allocated as entitlement to the neighboring enterprise application 138 associated with the virtual server application 134 that could be available under some circumstances, 30% in the example. The administrator also may know that the capacity accessed by the enterprise application 136 may drop to as low as 10% in the case where the neighboring enterprise application 138 associated with the virtual server application 134 encounters its own unusually high processing load. In this example, under circumstances when the administrators of the two enterprise applications 136, 138 executing on the physical server computer 130 are aware of percentages of physical processor capacity associated with their services, each may know that they have a 40% processor entitlement, corresponding to 4000 million instructions per second of processing power, and in extreme cases may have as high as 90% processor availability, corresponding to 9000 million instructions per second of processing power. The enterprise applications 136, 138 associated with the virtual server applications 132, 134, respectively, each effectively have virtual processors that under most circumstances do not drop below 4000 million instructions per second of processing power, can often go as high as 6000 million instructions per second of processing power, and under exceptional circumstances reach as high as 9000 and drop as low as 1000 million instructions per second of processing power. The administrator may only know and care that under the service level agreement, the enterprise application 136 is to be provided with processing capacity between 1000 and 9000 million instructions per second of processing power and with available capacity falling below 4000 million instructions per second of processing power only under unusual circumstances.

The present disclosure teaches the monitoring application 120 providing information about and promoting access for the enterprise applications 136, 138 to physical resources beyond the entitlement amounts, including processor entitlement, and allocations for memory and other physical resources provided by the physical server computers 130, 140. While the enterprise application 136, in the example provided, may be subject to a limit of 40% of the physical processor capacity of the physical server computer 130, and the administrator knows that he or she may not expect more than the 40% entitlement, an additional 20% of unallocated capacity may be available and, in an unusual case, some of the 40% entitlement of the neighboring enterprise application 138 executing on the virtual server application 134 also may be available if necessary. If the monitoring application 120 receives a request for information about available processor capacity for the enterprise application 136, the monitoring application 120 may base its response on total potential available capacity, which the monitoring application 120 may limit to the 40% entitlement plus the 20% unallocated capacity or a portion thereof, depending in part on the activity of the neighboring enterprise application 138 that shares the resources of the physical server computer 130. In the example, if the enterprise application 136 is using 38% out of its 40% entitlement, the virtualization management server 150 without the assistance of the monitoring application 120 might calculate and report processor usage as 38/40, or 95%. This reported percentage may be unnecessarily alarming to the administrator of the enterprise application 136, who may conclude that the enterprise application 136 is in danger of failing with the potential risk of data loss. Because the additional 20% allocated capacity is available, the monitoring application 120 instead may calculate and report processor usage as 38/60, or 63%, a more realistic and acceptable usage percentage than 95%. If the monitoring application 120 were to extend parameters further and include the 30% portion of the 40% entitlement of the neighboring enterprise application 138 as available capacity, the calculated and reported processor usage would be 38/90 or 42%, an even more tolerable level.

How and under what circumstances the monitoring application 120 may extend the available processing capacity to include portions or all of the unallocated 20% in the example or up to the 30% portion of the 40% entitlement of the neighboring enterprise application 138 may be subject to a plurality of considerations that the monitoring application 120 may actively process and adjust for. The activity of the neighboring enterprise application 138 may be a major factor because if its processing levels are low and do not exhibit signs of drastically increasing or spiking, then the 20% unallocated portion and some or all of the ¾ portion of the 40% entitlement (30% of the total processor capacity) of the neighboring enterprise application 138 may be considered accessible. On the other hand, if neighboring enterprise application 138 is heavily loaded with processing burden, the monitoring application 120 may not consider much if any of the 20% unallocated portion available and none of the 30% of the entitlement of the enterprise application 138 as available to the enterprise application 136.

The monitoring application 120 may promote efficient usage of physical resources of the physical server computers 130, 140 that host the virtual server applications 132, 134, 142, 144 that themselves provide platforms for the plurality of enterprise applications 136, 138, 146, 148. The monitoring application 120 also provides measures of resource usage that are as realistic and fair as possible to the enterprise applications 136, 138, 146, 148. The example provided wherein the administrator of the enterprise application 136 at first may be led to believe that processor utilization was 98% whereupon additional analysis by the monitoring application 120, processor utilization by another reasonable measure was 63% and was even as low as 42% by yet another measure may demonstrate the flexibility that the monitoring application 120 may bring to monitoring and management of virtual server resources. The monitoring application 120, in making determinations about information to provide to users, may balance the need for each enterprise application 136, 138 to be given as true and complete a picture as possible about resource availability with the responsibility to not overcommit as well as enforce discipline in usage by enterprise applications 136, 138.

In an embodiment, the monitoring application 120 may adjust the portions, if any, of the unallocated 20% in the example made available to the enterprise applications 136, 138. In an embodiment, the monitoring application 120 may make this adjustment one of every second, every minute, every hour, every day, or on some other basis. While the computations in the example provided were performed using percentages of the physical processing capacity of the physical server computer 130, in an embodiment million instructions per second or another measure or representation may be used.

The example provided described the physical server computer 130 as having a single physical processor or central processing unit (CPU) installed and described two enterprise applications 136, 138, each associated with a virtual server application 132, 134, respectively, sharing the single processor. In an embodiment, more than two enterprise applications 136, 138 may share the single processor.

In an embodiment, the physical server computer 130 may have multiple processors installed and more than two virtual server applications 132, 134 may be executing on the physical server computer 130. When the physical server computer 130 has two or more processors installed, the distinctions between physical processors may not be apparent and may not be of interest to administrators of enterprise applications 136, 138 associated with the virtual server applications 132, 134. The administrators may be more interested in the level of processing power and application response time they receive under service level agreements they may have with providers of services that may operate the virtualization management server 150 and the physical server computer 130. When there are multiple physical processors installed in the physical server computer 130, the workload of the enterprise application 136 may be handled by a single or multiple processors at various times depending on the workload of the enterprise application 136 and the workload of any other enterprise application 138 executing on the physical server computer 130.

The monitoring application 120 working with the virtualization management server 150, from time to time, may change the physical server computer 130 on which the virtual server application 132 executes. For example, the virtual server application 132 may be temporarily or permanently moved from the physical server computer 130 to the physical server computer 140. This may be done for a plurality of reasons including achieving more efficient use of physical server resources, balancing workload across the physical server computers 130, 140, or to free up capacity or storage space for a new virtual server application 132. In an embodiment, the virtual server application 132 may begin hosting a new enterprise application 136 that is determined to require significantly more processing capacity than the virtual server application 132 previously had been using and this may result in the need to relocate the virtual server application 132 between physical server computers 130, 140.

In an embodiment, a plurality of physical server computers 130, 140 may be components of a server farm. When virtual server applications 132, 134, 142, 144 are moved between physical server computers 130, 140, it may be necessary that the physical server computers 130, 140 are in the same server farm. When virtual server applications 132, 134, 142, 144 are moved between physical server computers 130, 140, internet protocol (IP) addressing may be a concern because the enterprise applications 136, 138, 146, 148 that the virtual server applications 132, 134, 142, 144 are hosting may contain configurations that designate specific internet protocol addresses. The movement of virtual server applications 132, 134, 142, 144 among physical server computers 130, 140 may be done with care in light of internet protocol addressing configured within the enterprise applications 136, 138, 146, 148.

The views provided by the monitoring application 120 may facilitate movement of enterprise applications 136, 138, 146, 148 across physical server computers 130, 140 within a server farm by providing a view of committed and available processor, memory, storage, and other physical resources with the server farm. In an embodiment, a virtual server application 132, 134, 142, 144 may be referred to as a logical partition (LPAR).

While a significant portion of the discussion of the present disclosure to this point has concerned capacity of processor or central processing unit, physical memory may be allocated and made available to a plurality of enterprise applications 136, 138, 146, 148 in manners similar to the allocation of processing capacity. Enterprise applications 136, 138 that execute on a physical server computer 130 may be provided minimum committed amounts of physical memory in a manner similar to processor entitlement. A portion of unallocated memory may be held in reserve for situations wherein processing load for at least one enterprise application 136, 138 becomes higher than usual. The present disclosure also teaches the inclusion of file system cache as available memory in replying to inquiries about available memory capacity. Memory that is allocated to an enterprise application 136 may be reallocated to a different enterprise application 138 when necessitated by hardware failures, movements or additions of new enterprise applications 136, 138, or upon the occurrence of other events.

The system and methods taught by the present disclosure provide a system wide view of physical and virtual server resources across a plurality of physical server computers 130, 140 in an enterprise network. The view may facilitate system expansion, contraction, and other changes that may be planned based on business requirements and other measurable and predictable factors. The view may promote an organization to more effectively develop maintenance schedules based on management's ability to view resource usage across a plurality of physical server computers 130, 140 and schedule outages to perform maintenance and upgrades. An organization may also undergo a business merger with another organization and the two organizations' information technology infrastructures may be merged, resulting in movement of physical resources. The organization may plan for the rolling into production of a new enterprise application 136, 138, 146, 148 that may necessitate the acquisition of new physical resources and/or reallocation of existing physical resources. The broad view of the organization's resources provided by the monitoring application 120 may promote a more balanced and efficient allocation of physical resources to the processing needs of the organization.

The system wide view described herein also may promote management of the organization to develop action plans to implement in response to unexpected hardware failures and other system outages. When such outages and failures occur, it may be necessary to rapidly move enterprise applications 136, 138, 146, 148 between physical server computers 130, 140 while minimizing user or customer inconvenience. The organization may formulate various action plans to deal with a plurality of failure and outage scenarios and may rehearse the implementation of those action plans in dry run tests. The organization may add complexity to the scenarios by factoring different user load assumptions into the failure and outage scenarios and determine the effectiveness of the action plans based on the different load assumptions. The system wide view provided herein may promote creation of more effective action plans to deal with a broad range of failure scenarios and system load assumptions.

The network 170 promotes communication between the components of the system 100. The network 170 may be any communication network including a public data network (PDN), a public switched telephone network (PSTN), a private network, and/or a combination.

Figure 2:
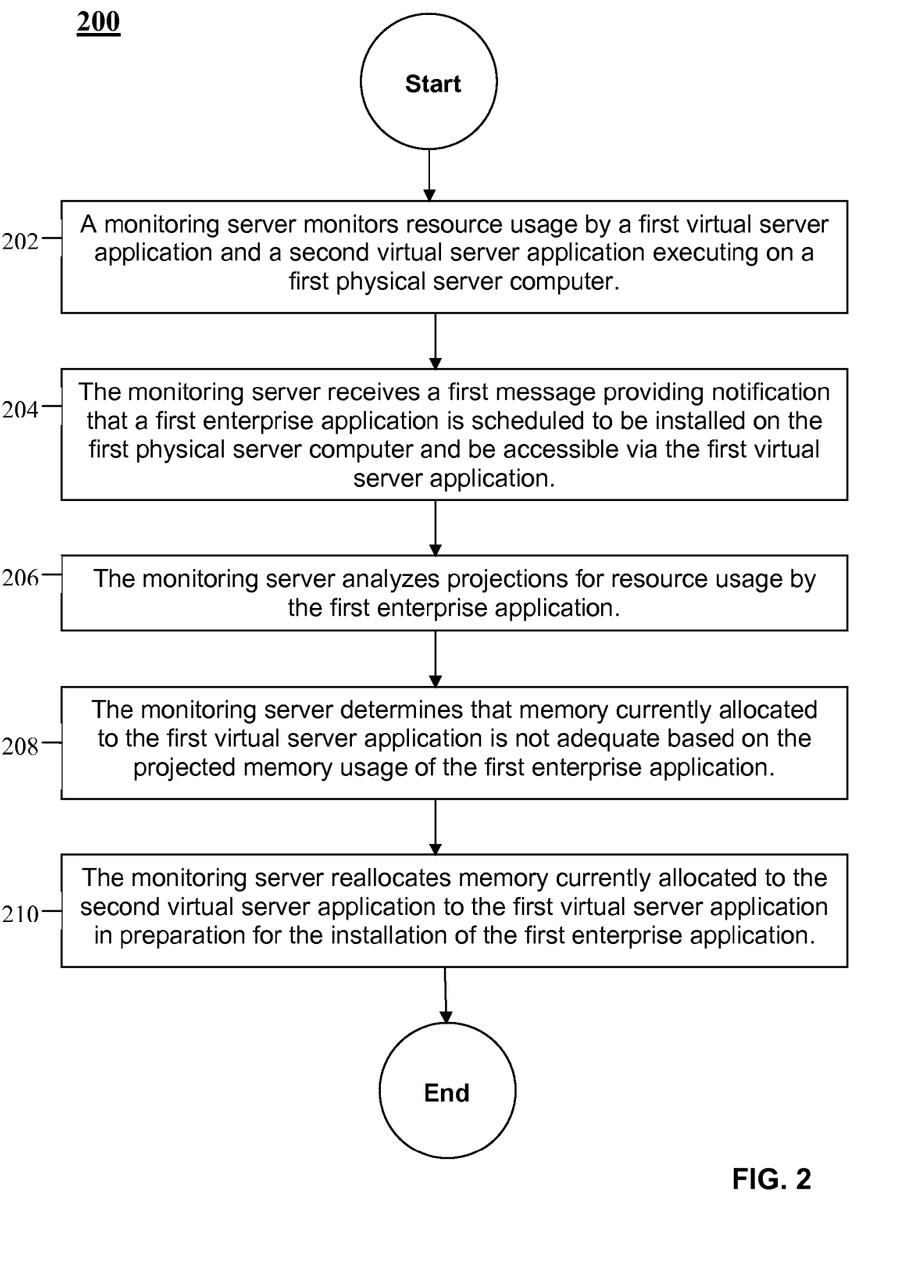
FIG. 2 is a flow chart illustrating a method according to an embodiment of the disclosure.

Turning now to FIG. 2, a processor-implemented method is provided. Beginning at block 202, a monitoring server monitors resource usage by a first virtual server application and a second virtual server application executing on a first physical server computer.

At block 204, the monitoring server receives a first message providing notification that a first enterprise application is scheduled to be installed on the first physical server computer and be accessible via the first virtual server application. At block 206, the monitoring server analyzes projections for resource usage by the first enterprise application.

At block 208, the monitoring server determines that memory currently allocated to the first virtual server application is not adequate based on the projected memory usage of the first enterprise application. At block 210, the monitoring server reallocates memory currently allocated to the second virtual server application to the first virtual server application in preparation for the installation of the first enterprise application.

Figure 3A:
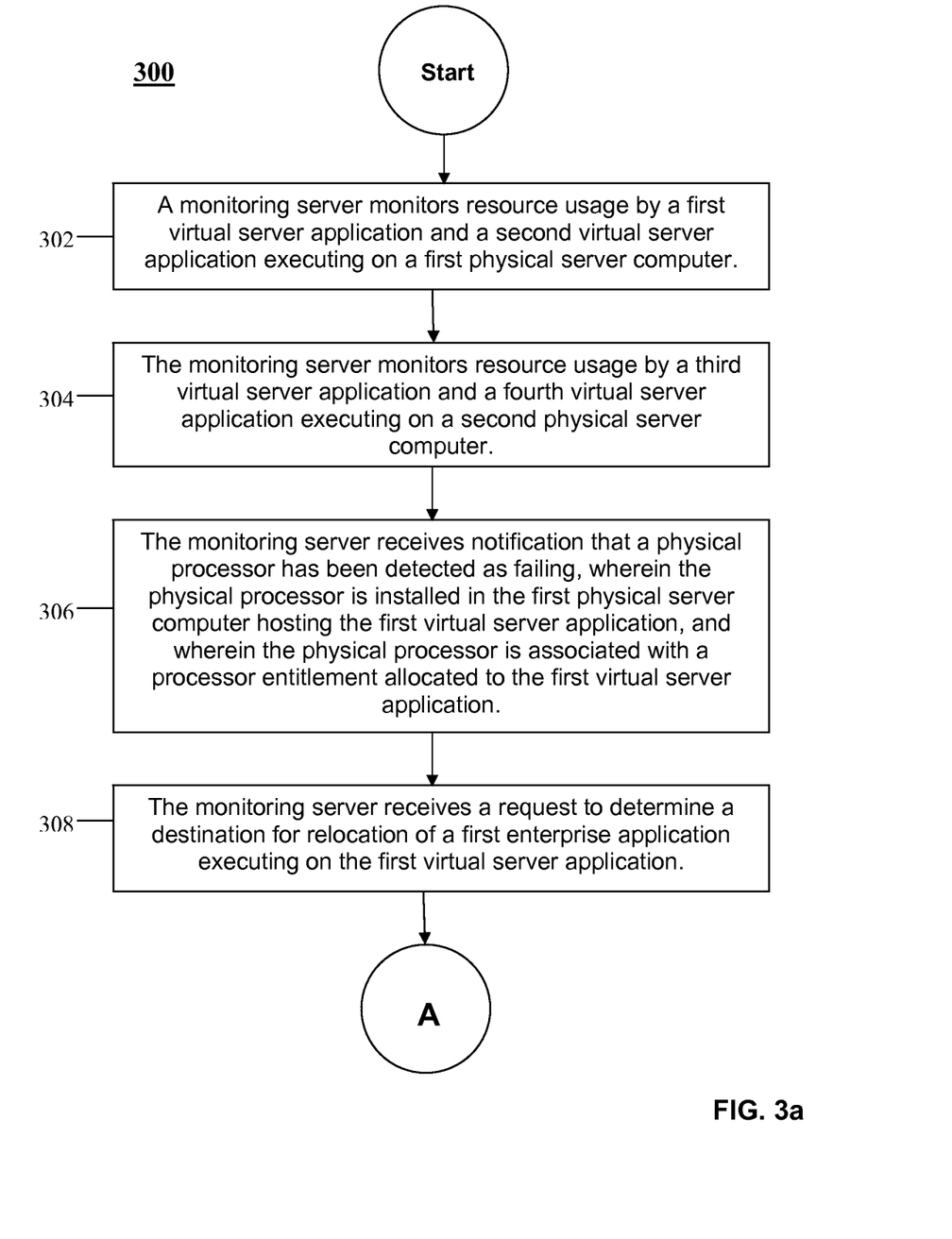
FIG. 3a is a flow chart illustrating a method according to an embodiment of the disclosure.
Figure 3B:
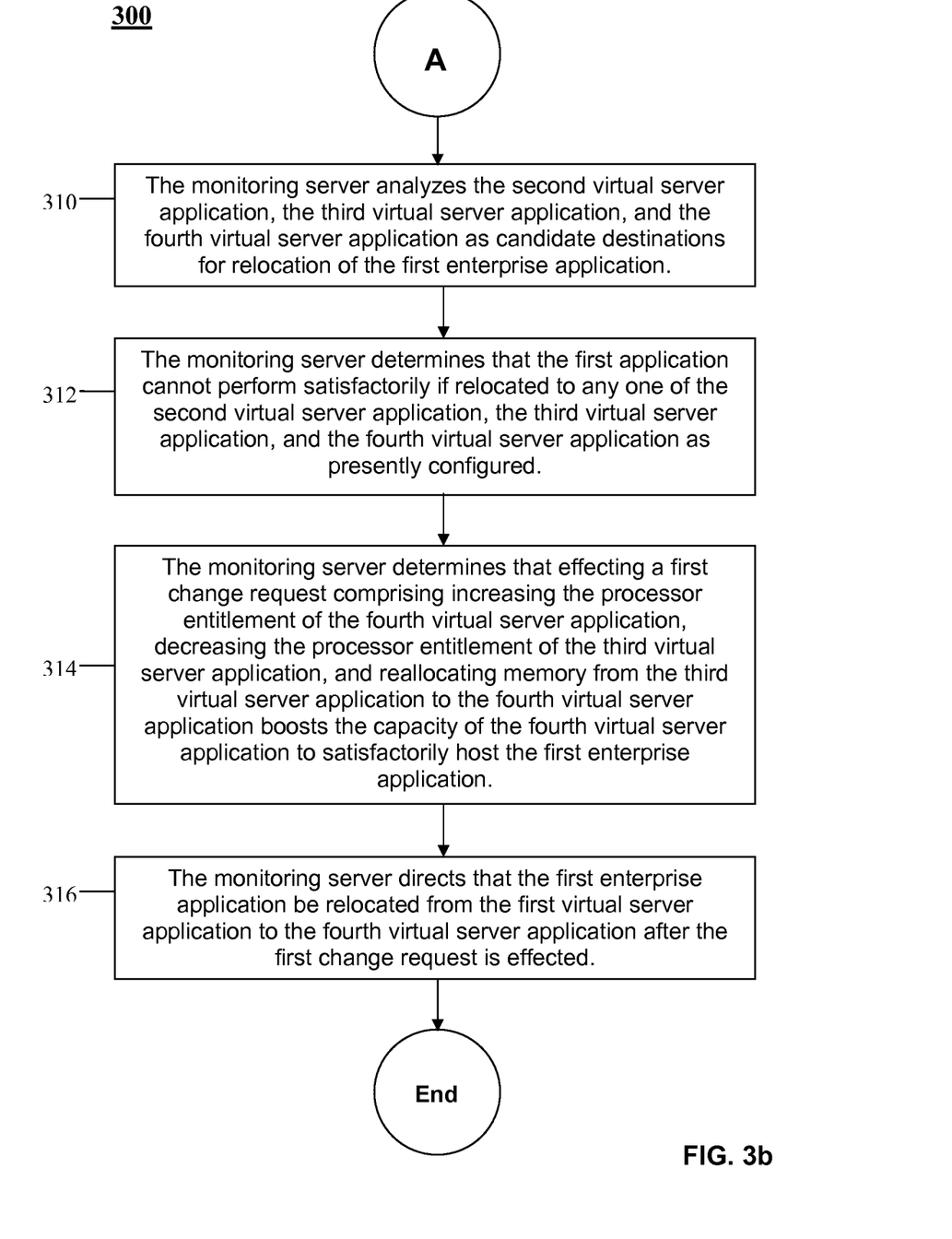
FIG. 3b is a flow chart illustrating a method according to an embodiment of the disclosure.

Turning now to FIG. 3*a* and FIG. 3*b*, a processor-implemented method 300 is provided. Beginning at block 302, a monitoring server monitors resource usage by a first virtual server application and a second virtual server application executing on a first physical server computer. At block 304, the monitoring server monitors resource usage by a third virtual server application and a fourth virtual server application executing on a second physical server computer.

At block 306, the monitoring server receives notification that a physical processor has been detected as failing, wherein the physical processor is installed in the first physical server computer hosting the first virtual server application, and wherein the physical processor is associated with a processor entitlement allocated to the first virtual server application. At block 308, the monitoring server receives a request to determine a destination for relocation of a first enterprise application executing on the first virtual server application.

At block 310, the monitoring server analyzes the second virtual server application, the third virtual server application, and the fourth virtual server application as candidate destinations for relocation of the first enterprise application. At block 312, the monitoring server determines that the first application cannot perform satisfactorily if relocated to any one of the second virtual server application, the third virtual server application, and the fourth virtual server application as presently configured.

At block 314, the monitoring server determines that effecting a first change request comprising increasing the processor entitlement of the fourth virtual server application, decreasing the processor entitlement of the third virtual server application, and reallocating memory from the third virtual server application to the fourth virtual server application boosts the capacity of the fourth virtual server application to satisfactorily host the first enterprise application. At block 316, the monitoring server directs that the first enterprise application be relocated from the first virtual server application to the fourth virtual server application after the first change request is effected.

Figure 4:
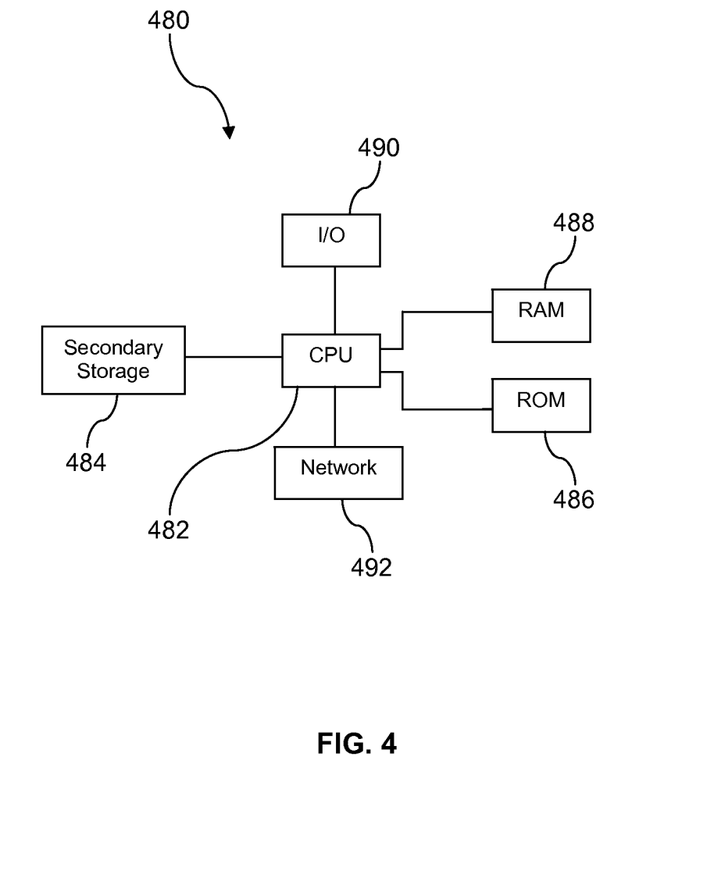
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as non-transitory storage and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method of virtual server resource monitoring and management, comprising:
    monitoring, by a monitoring server, resource usage by a first virtual server application and a second virtual server application executing on a first physical server computer;
    monitoring, by the monitoring server, resource usage by a third virtual server application and a fourth virtual server application executing on a second physical server computer;
    receiving, by the monitoring server, notification that a physical processor has been detected as failing, wherein the physical processor is installed in the first physical server computer hosting the first virtual server application, and wherein the physical processor is associated with a processor entitlement allocated to the first virtual server application;
    receiving, by the monitoring server, a request to determine a destination for relocation of an enterprise application executing on the first virtual server application;
    analyzing, by the monitoring server, the second virtual server application, the third virtual server application, and the fourth virtual server application as candidate destinations for relocation of the enterprise application;
    determining, by the monitoring server, that the enterprise application cannot perform satisfactorily when relocated to any one of the second virtual server application, the third virtual server application, and the fourth virtual server application as presently configured;
    determining, by the monitoring server, that effecting a change request comprising increasing a processor entitlement of the fourth virtual server application, decreasing a processor entitlement of the third virtual server application, and reallocating memory from the third virtual server application to the fourth virtual server application boosts the capacity of the fourth virtual server application to satisfactorily host the enterprise application; and
    directing, by the monitoring server, that the enterprise application be relocated from the first virtual server application to the fourth virtual server application after the change request is effected.

2. The method of claim 1, wherein the first physical server computer and the second physical server computer are in the same server farm.

3. The method of claim 1, wherein after increasing the processor entitlement of the fourth virtual server application and decreasing the processor entitlement of the third virtual server application, processor capacity in the second physical server computer not allocated to a virtual server application remains available.

4. The method of claim 1, further comprises analyzing, by the monitoring server, a plurality of hardware failure scenarios potentially requiring movement of enterprise applications between virtual server applications and physical server computers and potentially requiring reallocation of processor and memory resources to the virtual server applications.

5. The method of claim 1, further comprising reserving, by the monitoring server, unallocated memory installed in the first physical server computer and installed in the second physical server computer for movement of previously installed enterprise applications and installation of new enterprise applications.

6. The method of claim 1, wherein each of the first physical server computer and the second physical server computer is a single physical processor computer or a multiple physical processor computer.

7. The method of claim 1, further comprising receiving, by the monitoring server, a request for a report of available processor capacity for the enterprise application.

8. The method of claim 7, in response to the request, sending, by the monitoring server, the report of the available processor capacity for the enterprise application, wherein the available processor capacity for the enterprise application includes the processor entitlement of the fourth virtual server application and at least a portion of unallocated processor capacity.

9. The method of claim 8, wherein the available processor capacity for the enterprise application further includes a portion of the processor entitlement of the third virtual server application.

10. The method of claim 9, wherein the portion of the processor entitlement of the third virtual server application included in the available processor capacity for the enterprise application is based on a load of another enterprise application executing on the third virtual server application.

* * * * *